United States Patent
Singh et al.

(10) Patent No.: US 9,643,856 B2
(45) Date of Patent: May 9, 2017

(54) METHODS AND SYSTEMS FOR MAKING AMMONIA IN A DOUBLE AMMONIA CONVERTER SYSTEM

(71) Applicant: Kellogg Brown & Root LLC, Houston, TX (US)

(72) Inventors: Shashi Prakash Singh, Missouri City, TX (US); Akhil Jain Nahar, Delhi (IN); Stephen Allen Noe, Tomball, TX (US)

(73) Assignee: Kellogg Brown+Root LLC, Houston, TX (US)

(*) Notice: Subject to any disclaimer, the term of this patent is extended or adjusted under 35 U.S.C. 154(b) by 326 days.

(21) Appl. No.: 14/452,469

(22) Filed: Aug. 5, 2014

(65) Prior Publication Data
US 2015/0044121 A1     Feb. 12, 2015

Related U.S. Application Data

(60) Provisional application No. 61/863,281, filed on Aug. 7, 2013.

(51) Int. Cl.
    *C01C 1/04*            (2006.01)
    *B01J 19/00*          (2006.01)
    (Continued)

(52) U.S. Cl.
    CPC ............ *C01C 1/0458* (2013.01); *B01J 19/00* (2013.01); *C01B 3/025* (2013.01); *C01B 3/12* (2013.01);
    (Continued)

(58) Field of Classification Search
None
See application file for complete search history.

(56) References Cited

U.S. PATENT DOCUMENTS 3,441,393 A * 4/1969 Multhaup ............... C01B 3/025
                                                              422/626
3,484,197 A * 12/1969 Hayes ................... C01C 1/0405
                                                              422/148
(Continued)

FOREIGN PATENT DOCUMENTS

RU          1456362        *   2/1989             C01C 1/04

OTHER PUBLICATIONS

Air Products, Pressure-Swing Adsorption for CO2 Capture from Sour Syngas, 2010, pp. 1-2, Air Products and Chemicals, Inc.
(Continued)

*Primary Examiner* — Wayne Langel
(74) *Attorney, Agent, or Firm* — Gary Machetta

(57) ABSTRACT

Methods and systems for making ammonia are provided. The method can include heating a first compressed syngas to produce a heated first syngas. The heated first syngas and a second compressed syngas can be combined to produce a combined syngas. The combined syngas can be reacted within a first ammonia converter and a second ammonia converter to produce an ammonia product. Heat from the ammonia product can be transferred to a first heat transfer medium to produce a first cooled product and a second heat transfer medium. Heat from the first cooled product can be transferred to a third heat transfer medium to produce a second cooled product. Heat from the second cooled product can be transferred to the combined syngas to produce a third cooled product. The third cooled product can be separated to produce a purified ammonia product and a recycle gas.

15 Claims, 2 Drawing Sheets

(51) Int. Cl.
*C01B 3/02* (2006.01)
*C01B 3/12* (2006.01)
*C01B 3/38* (2006.01)

(52) U.S. Cl.
CPC .............. *C01B 3/38* (2013.01); *C01C 1/04* (2013.01); *C01C 1/0405* (2013.01); *C01B 2203/0233* (2013.01); *C01B 2203/0283* (2013.01); *C01B 2203/043* (2013.01); *C01B 2203/047* (2013.01); *C01B 2203/0445* (2013.01); *C01B 2203/0475* (2013.01); *C01B 2203/068* (2013.01); *C01B 2203/141* (2013.01); *C01B 2203/142* (2013.01); *C01B 2203/143* (2013.01); *C01B 2203/146* (2013.01); *Y02P 20/132* (2015.11); *Y02P 20/52* (2015.11)

(56) References Cited

U.S. PATENT DOCUMENTS

| | | | |
|---|---|---|---|
| 3,615,200 A * | 10/1971 | Konoki | C01C 1/0476 422/148 |
| 4,056,603 A * | 11/1977 | Bresler | C01C 1/0405 423/359 |
| 4,180,553 A * | 12/1979 | Null | C01B 3/501 423/359 |
| 4,194,890 A | 3/1980 | McCombs et al. | |
| 4,263,018 A | 4/1981 | McCombs et al. | |
| 4,298,589 A * | 11/1981 | LeBlanc | B01J 8/0005 422/148 |
| 4,907,643 A | 3/1990 | Grotz et al. | |
| 5,011,625 A | 4/1991 | LeBlanc | |
| 5,122,299 A | 6/1992 | LeBlanc | |
| 5,362,454 A | 11/1994 | Cizmer et al. | |
| 5,736,116 A | 4/1998 | LeBlanc et al. | |
| 6,171,570 B1 | 1/2001 | Czuppon | |
| 7,070,750 B2 * | 7/2006 | Lippmann | C01C 1/0411 423/359 |
| 7,183,326 B2 * | 2/2007 | Davey | C01B 3/025 423/359 |
| 7,550,215 B2 | 6/2009 | Malhotra et al. | |
| 7,867,460 B2 | 1/2011 | Singh et al. | |
| 7,867,465 B2 | 1/2011 | Blanchard | |
| 7,892,511 B2 | 2/2011 | Strait | |
| 7,955,496 B2 | 6/2011 | Iqbal et al. | |
| 8,307,671 B2 * | 11/2012 | Jungerhans | F25J 3/0219 423/359 |
| 8,591,770 B2 * | 11/2013 | Filippi | C01B 3/02 252/374 |
| 8,617,270 B2 | 12/2013 | Haque | |
| 9,463,983 B2 * | 10/2016 | Ostuni | C01B 3/025 |
| 2011/0206594 A1 | 8/2011 | Singh et al. | |
| 2012/0195817 A1 | 8/2012 | Singh et al. | |
| 2015/0044121 A1 | 2/2015 | Singh et al. | |

OTHER PUBLICATIONS

Shashi Singh, New KBR Ammonia Synthesis Loop Revamp Technology Improves Plant Energy Efficiency, Nitrogen & Syngas Conference, Feb. 2009, pp. 1-8, KBR, Houston, Texas, USA.
KBR Technology, Ammonia Revamp—How in Your World, 2011, pp. 1-7, KBR.

* cited by examiner

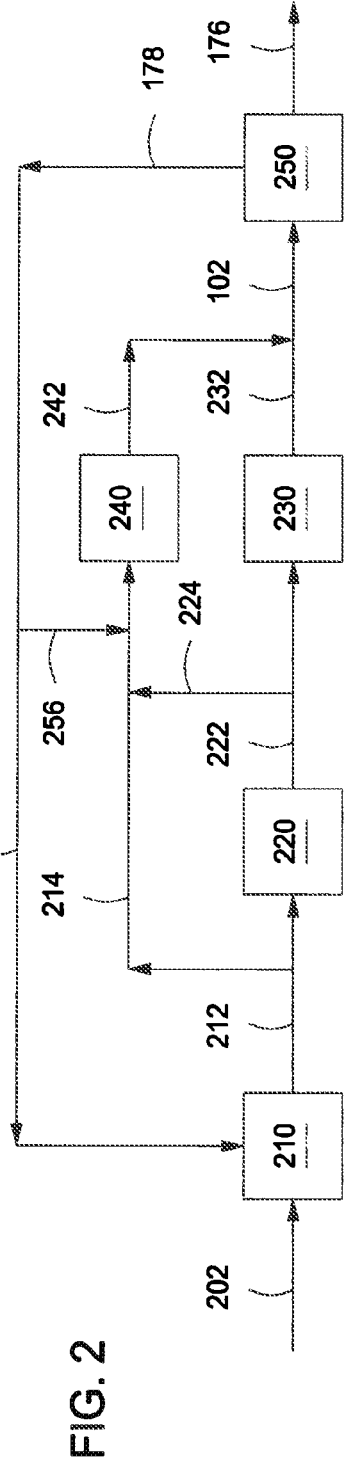
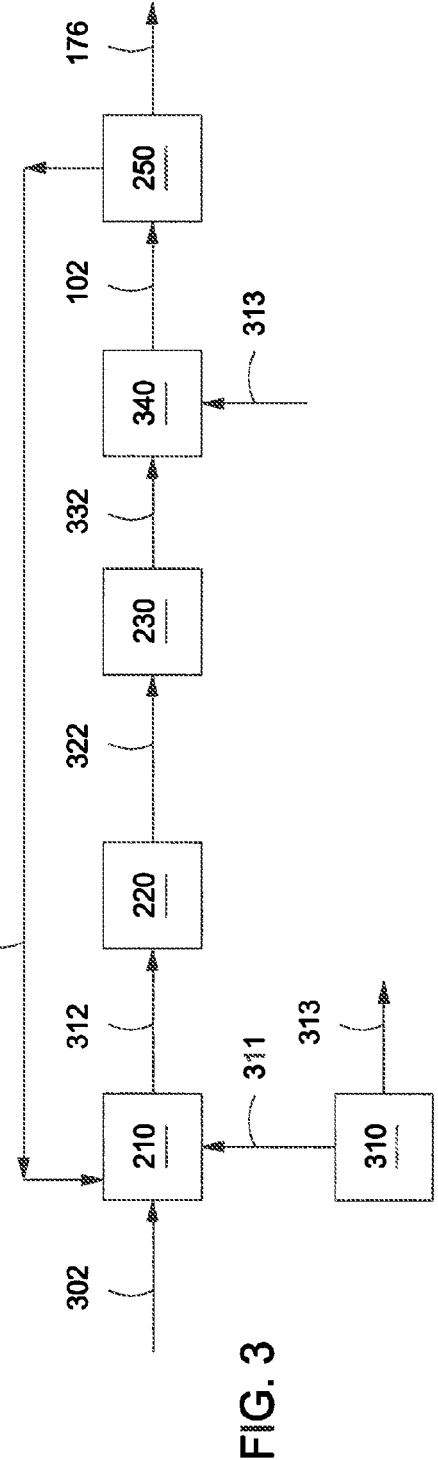
FIG. 2
FIG. 3

METHODS AND SYSTEMS FOR MAKING AMMONIA IN A DOUBLE AMMONIA CONVERTER SYSTEM

This application claims priority to U.S. Provisional Patent Application having Ser. No. 61/863,281, filed on Aug. 7, 2013, which is incorporated by reference herein in its entirety.

BACKGROUND

Field

Embodiments disclosed generally relate to methods and systems for making ammonia. More particularly, such embodiments relate to methods and systems for converting a syngas containing hydrogen and nitrogen to ammonia.

Description of the Related Art

Ammonia is commonly produced by reacting hydrogen and nitrogen in the presence of a catalyst in a reaction zone of an ammonia synthesis converter. Synthesis gas or "syngas" is typically the source of the hydrogen and nitrogen. Syngas is typically produced by reforming a carbon containing material in the presence of steam and/or an oxidant at high temperatures. Any unreacted components of the syngas can be recovered and recycled to the ammonia converter, which is often referred to as "an ammonia synthesis loop." Make-up syngas is continuously added to the ammonia synthesis loop to provide fresh hydrogen and nitrogen.

The recycle of unreacted hydrogen and nitrogen reduces the flow rate of syngas to the ammonia synthesis loop, thereby preventing maximum capacity ammonia production. There is a need, therefore, for improved methods and systems for making ammonia.

BRIEF DESCRIPTION OF THE DRAWINGS

FIG. 2 depicts a schematic of an illustrative system for producing syngas, according to one or more embodiments described.

FIG. 3 depicts a schematic of another illustrative system for producing syngas, according to one or more embodiments described.

DETAILED DESCRIPTION

Figure 1:
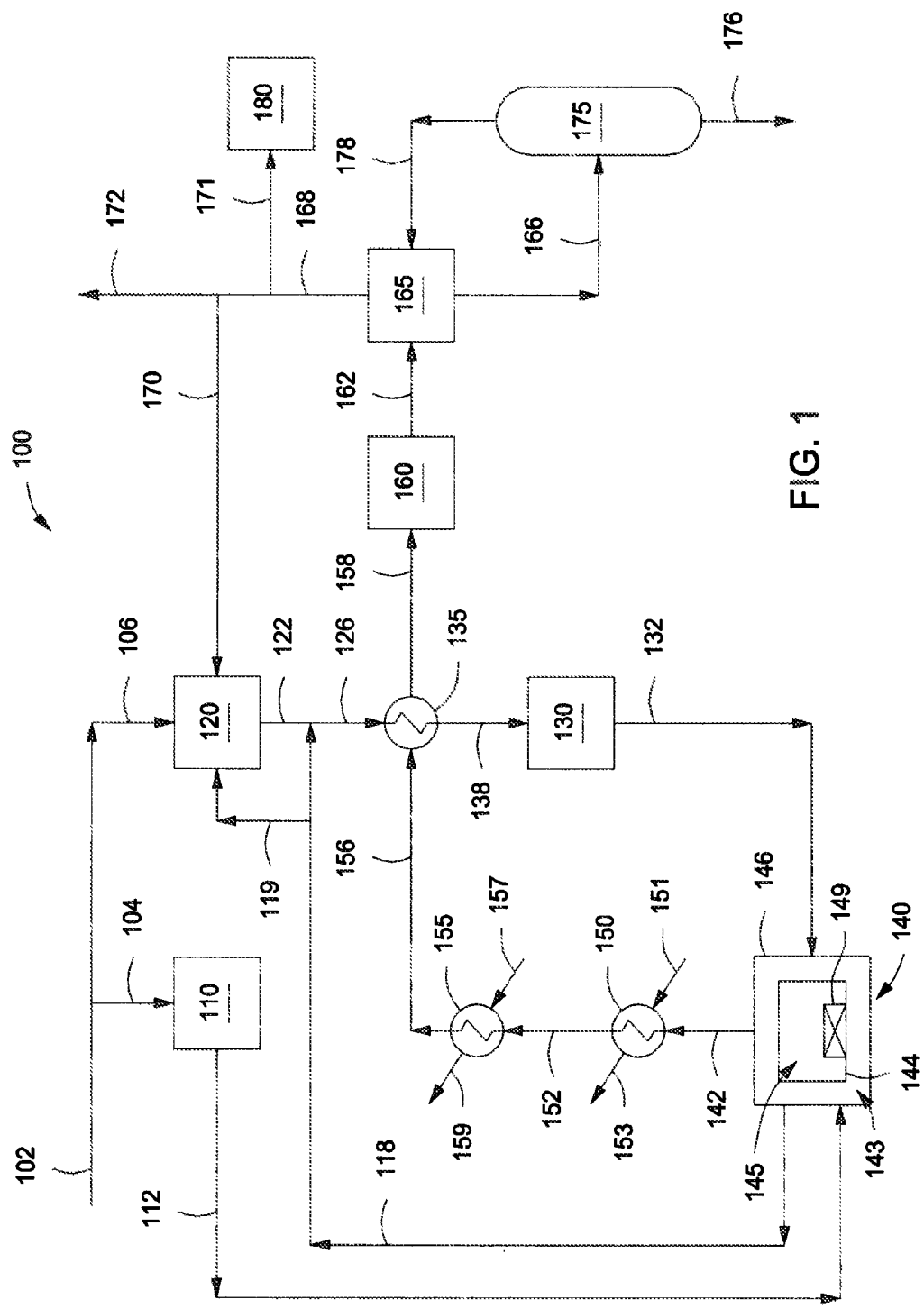
FIG. 1 depicts a schematic of an illustrative system for producing ammonia, according to one or more embodiments described.

Methods and systems for making ammonia are provided. In one or more embodiments, the method can include compressing a first syngas and a second syngas to produce a first compressed syngas and a second compressed syngas. The first compressed syngas can be heated to produce a heated first syngas at a temperature of about 60° C. to about 350° C. The heated first syngas and the second compressed syngas can be combined to produce a combined syngas at a temperature of about 60° C. to about 200° C. The combined syngas can be reacted in a first ammonia converter to produce an effluent. The effluent can be reacted in a second ammonia converter to produce an ammonia product. Heat from the ammonia product can be transferred to a first heat transfer medium to produce a first cooled product at a temperature of about 150° C. to about 375° C. and a second heat transfer medium. Heat can be transferred from the first cooled product to a third heat transfer medium to produce a second cooled product. Heat can be transferred from the second cooled product to the combined syngas to produce a third cooled product. The third cooled product can be separated to produce a purified ammonia product and a recycle gas.

FIG. 1 depicts a schematic of an illustrative system 100 for producing ammonia, according to one or more embodiments. The system 100 can include a first compressor unit 110 configured to compress and/or dry a first syngas in line 104 to produce a first compressed syngas via line 112. The first compressed syngas in line 112 can be heated by indirect heat exchange with an ammonia product and/or an effluent in a second ammonia converter 140 to produce a heated first syngas via line 118. A second syngas in line 106 can be compressed and/or dried in a second compressor unit 120 to produce a second compressed syngas via line 122. The heated first syngas in line 118 and the second compressed syngas in line 122 can be mixed or otherwise combined to provide a combined syngas via line 126. The combined syngas in line 126 can be heated in a heat exchanger 135 to produce a heated syngas via line 138. The heated syngas in line 138 can be introduced to a first ammonia converter 130 to produce the effluent via line 132. The effluent via line 132 can be introduced to the second ammonia converter 140 to produce the ammonia product via line 142. The ammonia product in line 142 can be cooled in one or more heat exchangers (three are shown) 150, 155, 135 to produce a cooled ammonia product via line 158. The cooled ammonia product via line 158 can be introduced to a separator 175 to produce a purified ammonia product via line 176 and a recycle gas via line 178.

In one or more embodiments, a syngas via line 102 can be divided, apportioned, split, or otherwise separated into the first syngas via line 104 and the second syngas via line 106. The syngas in line 102 can have a hydrogen concentration of about 60 mol %, about 65 mol %, about 70 mol %, or about 75 mol % to about 77 mol %, about 80 mol %, about 85 mol %, or about 90 mol %. The syngas in line 102 can have a nitrogen concentration of about 10 mol %, about 15 mol %, about 20 mol %, or about 24 mol % to about 26 mol %, about 28 mol %, about 30 mol %, or about 35 mol %. The syngas in line 102 can have an ammonia concentration of 0 mol %, about 0.001 mol %, about 0.005 mol %, or about 0.01 mol % to about 0.1 mol %, about 0.3 mol %, about 0.5 mol %, or about 1 mol %. The syngas in line 102 can have a carbon dioxide concentration of 0 mol %, about 0.001 mol %, about 0.005 mol %, or about 0.01 mol % to about 0.1 mol %, about 0.3 mol %, about 0.5 mol %, or about 1 mol %. The syngas in line 102 can have a carbon monoxide concentration of 0 mol %, about 0.001 mol %, about 0.005 mol %, or about 0.01 mol % to about 0.1 mol %, about 0.3 mol %, about 0.5 mol %, or about 1 mol %. The syngas in line 102 can have a methane concentration of about 0.1 mol %, about 0.5 mol %, about 0.6 mol %, or about 0.9 mol % to about 1.2 mol %, about 1.4 mol %, about 1.8 mol %, or about 2 mol %. The syngas in line 102 can have an argon concentration of about 0.1 mol %, about 0.3 mol %, about 0.4 mol %, or about 0.8 mol % to about 1.2 mol %, about 1.4 mol %, about 1.8 mol %, or about 2 mol %. All concentrations presented herein as "mol %" should be considered on a dry basis, e.g., "mol % dry basis," unless otherwise indicated.

The first syngas in line 104 can include from about 10 vol % to about 70 vol % of the total amount of the syngas in line 102. The second syngas in line 106 can include from about 90 vol % to about 30 vol % of the total amount of the syngas in line 102. For example, the first syngas in line 104 can include from about 20 vol % to about 60 vol % of the total amount of the syngas in line 102 and the second syngas in line 106 can include from about 80 vol % to about 40 vol % of the total amount of the syngas in line 102. In one or more embodiments, the first syngas in line 104 and the second syngas in line 106 can be different from one another, derived from different sources, or the like.

The first syngas in line 104 can be at a temperature of about 0° C., about 4° C., about 6° C., or about 10° C. to about 15° C., about 25° C., about 35° C., or about 45° C. when introduced to the first compressor unit 110. The first syngas in line 104 can be at a pressure of about 1,500 kPa, about 2,000 kPa, about 2,500 kPa, or about 2,600 kPa to about 2,700 kPa, about 3,500 kPa, about 4,500 kPa, or about 5,500 kPa when introduced to the first compressor unit 110.

The first compressor unit 110 can include a one or more compression zones. For example, the first compressor unit 110 can include a single stage compressor, a two stage compressor, or a three stage compressor. The first compressor unit 110 can be or include any number of compressors arranged in parallel and/or in series. The first compressor unit 110 can have one or more casings or pressure shells. For example, the first compressor unit 110 can include a single casing compressor, a double casing compressor, and/or a triple casing compressor. The first compressor unit 110 can be driven by an electric motor, a gas powered motor, one or more turbines, or any combination thereof.

In one or more embodiments, the first compressor unit 110 can include one or more driers. For example, at least a portion of any water (gas, liquid, or a mixture thereof) contained in the first syngas in line 104 can be removed by the one or more driers. The water can be removed using any suitable system, device, or combination of systems and/or devices. For example, at least a portion of any water in the syngas can be removed via an adsorption or absorption process. The first compressed syngas in line 112 can have a water concentration of 0 mol % to about 1 mol %.

The heated first syngas via line 118 can be at a temperature of about 60° C., about 75° C., about 90° C., or about 115° C. to about 120° C., about 175° C., about 250° C., or about 350° C. The heated first syngas via line 118 produced by the second ammonia converter 140 can be at a pressure of about 9,000 kPa, about 12,000 kPa, about 14,000 kPa, or about 15,000 kPa to about 16,000 kPa, about 17,000 kPa, about 18,000 kPa, or about 20,000 kPa. In one or more embodiments, at least a portion of the heated first syngas via line 118 can be introduced to the second compressor unit 120 to produce the second compressed syngas 122.

The second compressor unit 120 can include one or more compressors and one or more driers, which can be the same as or similar to the first compressor unit 110 discussed and described above. The second compressed syngas in line 122 can be at a temperature of about 50° C., about 75° C., about 85° C., or about 100° C. to about 125° C., about 150° C., about 175° C., or about 200° C. The second compressed syngas in line 122 can be at a pressure of about 9,000 kPa, about 12,000 kPa, about 14,000 kPa, or about 15,000 kPa to about 16,000 kPa, about 17,000 kPa, about 18,000 kPa, or about 20,000 kPa. The second compressed syngas in line 122 can have a water concentration of 0 mol % to about 1 mol %.

The heated first syngas in line 118 and the second compressed syngas in line 122 can be combined in a pipe, line, or other conduit sufficient to provide the combined syngas via line 126. The first compressed syngas in line 118 and second compressed syngas in line 122 can be combined with one another at any desired ratio to produce the combined syngas via line 126. The amount of the heated first syngas in line 118 within the combined syngas in line 126 can be used to control, determine, or otherwise adjust the temperature and/or pressure of the combined syngas in line 126. For example, the combined syngas in line 126 can be made of a specified percentage of the first compressed syngas and a specified percentage of the second compressed syngas. The first compressed syngas from line 118 can make up about 15%, about 20%, about 30%, about 40%, or about 50% to about 60%, about 70%, about 80%, about 90%, about 95%, or about 100% of the combined syngas in line 126. The second compressed syngas from line 122 can make up about 30%, about 35%, about 40%, about 45%, or about 50% to about 60%, about 70%, about 80%, about 90%, about 95%, or about 100% of the combined syngas in line 126. The combined syngas in line 126 can have a ratio of first compressed syngas 118 to second compressed syngas 122 (via line 118: via line 122) of about 1:1, about 1:2, or about 1:4 to about 2:1, about 1:5, or about 1:6.

The combined syngas 126 can be at a temperature of about 60° C., about 75° C., about 85° C., or about 95° C. to about 125° C., about 150° C., about 175° C., or about 200° C. The combined syngas 126 can be at a pressure of about 9,000 kPa, about 12,000 kPa, about 14,000 kPa, or about 15,000 kPa to about 16,000 kPa, about 17,000 kPa, about 18,000 kPa, or about 20,000 kPa.

In one or more embodiments, the combined syngas via line 126 can be heated in the heat exchanger 135 to produce the heated syngas via line 138. The heated syngas in line 138 can be at a temperature of about 85° C., about 125° C., about 170° C., or about 180° C. to about 200° C., about 250° C., about 300° C., or about 350° C. The heated syngas in line 138 can be at a pressure of about 9,000 kPa, about 12,000 kPa, about 14,000 kPa, or about 14,500 kPa to about 16,000 kPa, about 17,000 kPa, about 18,000 kPa, or about 20,000 kPa. The heated syngas via line 138 can be introduced to the first ammonia converter 130 to produce the effluent via line 132. At least a portion of the nitrogen and hydrogen in the heated syngas in line 138 can be reacted, combined, or otherwise chemically bonded in the presence of a first catalyst within the first ammonia converter 130 to product the effluent via line 132. Non-reacted hydrogen and nitrogen can be present in the effluent in line 132. The first ammonia converter 130 can be a conventional single or multi-pass converter using one or more noble metal catalysts, or one or more catalysts based upon ruthenium, such as the ruthenium-based KAAP catalyst available from KBR, Inc. The use of one or more higher activity, noble metal catalysts can allow the use of lower pressures within the ammonia synthesis loop, thereby permitting use of a one or more single barrel ammonia compressors.

The effluent in line 132 can have a hydrogen concentration of about 45 mol %, about 50 mol %, about 56 mol %, or about 59 mol % to about 64 mol %, about 68 mol %, about 72 mol %, or about 75 mol %. The effluent in line 132 can have a nitrogen concentration of about 10 mol %, about 15 mol %, about 18 mol %, or about 19 mol % to about 20 mol %, about 21 mol %, about 25 mol %, or about 30 mol %. The effluent in line 132 can have an ammonia concentration of about 10 mol %, about 15 mol %, about 17 mol %, or about 19 mol % to about 20 mol %, about 21 mol %, about 23 mol %, or about 25 mol %. The effluent in line 132 can have a carbon dioxide concentration of 0 mol %, about 0.001 mol %, about 0.005 mol %, or about 0.01 mol % to about 0.05 mol %, about 0.1 mol %, about 0.5 mol %, or about 1 mol %. The effluent in line 132 can have a carbon monoxide concentration of 0 mol %, about 0.001 mol %, about 0.005 mol %, or about 0.01 mol % to about 0.05 mol %, about 0.1 mol %, about 0.5 mol %, or about 1 mol %. The effluent in line 132 can have a methane concentration of 0 mol %, about 3 mol %, about 5 mol %, or about 6 mol % to about 8 mol %, about 10 mol %, about 12 mol %, or about 15 mol %. The effluent in line 132 can have an argon concentration of 0 mol %, about 1 mol %, about 2 mol %, or about 3 mol % to about 4 mol %, about 5 mol %, about 7 mol %, or about 10 mol %. The effluent in line 132 can be at a temperature of about 10° C., about 13° C., about 15° C., or about 17° C. to about 19° C., about 22° C., about 24° C., or about 28° C.

The first ammonia converter 130 can also include any reactor configured to operate at elevated pressures and/or temperatures to convert at least a portion of a feedstock containing nitrogen and hydrogen, e.g., the combined syngas in line 126, to ammonia. The first ammonia converter 130 can include one or more "Split-Flow Ammonia Converters," as discussed and described in U.S. Pat. No. 7,081,230. The first ammonia converter 130 can include one or more "Isothermal Ammonia Converters," as discussed and described in U.S. Pat. No. 6,171,570, The first ammonia converter 130 can include one or more "Horizontal Ammonia Converter Adapted for High Activity Catalyst," as discussed and described in U.S. Pat. No. 6,132,687. The first ammonia converter 130 can include one or more ammonia converters as discussed and described in U.S. Pat. No. 7,867,460.

The effluent via line 132 can be introduced to the second ammonia converter 140 to produce the ammonia product via line 142. The second ammonia converter 140 can be or include one or more conventional single or multi-pass converters using one or more magnetite catalysts. In one or more embodiments, the second ammonia converter 140 can be the same as, similar to, or different than the first ammonia convert 130 as discussed and described above. In one or more embodiments, at least a portion of the nitrogen and hydrogen in the combined syngas can be reacted, combined, or otherwise chemically bonded in the presence of a second catalyst within a reaction zone 149 of the second ammonia converter 140 to produce the ammonia product 142. The second catalyst within the reaction zone 149 can include, but is not limited to magnetite catalyst, ruthenium catalyst, Wüstite catalyst, or any mixture thereof.

In one or more embodiments, during operation of the second ammonia converter 140, the effluent 132 that can include nitrogen and hydrogen can be introduced to the reaction zone 149 within an inner shell 144 of the second ammonia converter 140. The reaction zone 149 can include one or more catalysts. The reaction between the hydrogen and nitrogen contained in the effluent 132 can produce the ammonia product via line 142 that can have an increased ammonia content relative to the effluent in line 132. The second ammonia converter 140 can increase the amount of the hydrogen and nitrogen introduced to the system 100 that reacts to produce ammonia, which can significantly reduce the amount of unreacted hydrogen and nitrogen that needs to be recycled within the system 100. With less recycled hydrogen and nitrogen, the system 100 can process a greater amount of syngas than a system without the second ammonia converter unit 140.

In one or more embodiments, the second ammonia converter 140 can include an inner shell 144 disposed inside an outer shell 146. The reaction zones 149 can be formed in the inner shell 144. A space 143 can be formed between the inner shell 144 and the outer shell 146. The first compressed syngas in line 112 can be heated within the space 143 to produce the heated first syngas via line 118. For example, the first compressed syngas in line 112 can be heated in an outer volume or region, e.g., the space 143, of the second ammonia converter 140 by indirect heat exchange with the effluent and/or the ammonia product produced in the reaction zone 149. In one or more embodiments, the space 143 can have any form or shape, including an annular shape. The first compressed syngas in line 112 can be in fluid communication with the inner shell 144 and the outer shell 146 and the space 143 formed therebetween, The effluent via line 132 can be introduced to the reaction zone 149 to convert at least a portion of the hydrogen and at least a portion of the nitrogen present in the effluent 132 to ammonia. The reaction between the hydrogen and nitrogen can be an exothermic reaction. The exothermic reaction and/or the effluent via line 132 can provide heat to the second ammonia converter 140, at least a portion of which can be transferred to the first compressed syngas flowing through the space 143. The first compressed syngas 112 can flow through the space 143 to cool the inner shell 144 and the outer shell 146. As such, the first compressed syngas 112 can remove heat generated by the exothermic reaction to produce the heated first compressed syngas via line 118. The outer shell 146 can be cooled such that the outer shell temperature can be maintained at a lower temperature than the inner shell temperature. The second ammonia converter 140 can include one or more "Cold Wall Horizontal Ammonia Converters," as discussed and described in U.S. Pat. No. 7,867,465.

The temperature within the reaction zone 149 can be from about 300° C., about 357° C., about 400° C., or about 425° C. to about 435° C., about 465° C., about 485° C., or about 530° C. As discussed above, the average temperature of the reaction zone 149 and the outer shell 146 can be maintained by introducing the first compressed syngas 112 having a temperature of about 50° C., about 70° C., about 80° C., or about 90° C. to about 100° C., about 130° C., about 160° C., or about 200° C. and a flow rate of about 10% to about 90% or about 20% to about 80% of the mass flow rate of the effluent 132 through the second ammonia converter 140.

The ammonia product in line 142 can have a hydrogen concentration of about 45 mol %, about 48 mol %, about 50 mol %, or about 52 mol % to about 54 mol %, about 56 mol %, about 60 mol %, or about 65 mol %. The ammonia product in line 142 can have a nitrogen concentration of about 10 mol %, about 14 mol %, about 17 mol %, or about 18 mol % to about 20 mol %, about 23 mol %, about 26 mol %, or about 30 mol %. The ammonia product in line 142 can have an ammonia concentration of about 10 mol %, about 14 mol %, about 17 mol %, or about 19 mol % to about 20 mol %, about 23 mol %, about 26 mol %, or about 30 mol %. The ammonia product in line 142 can have an ammonia concentration of about 75 mol %, about 85 mol %, about 90 mol %, or about 95 mol % to about 97 mol %, about 98 mol %, about 99 mol %, or about 100 mol %. The ammonia product in line 142 can have a carbon dioxide concentration of 0 mol %, about 0.001 mol %, about 0.005 mol %, or about 0.01 mol % to about 0.05 mol %, about 0.1 mol %, about 0.5 mol %, or about 1 mol %. The ammonia product in line 142 can have a carbon monoxide concentration of 0 mol %, about 0.001 mol %, about 0.005 mol %, or about 0.01 mol % to about 0.05 mol %, about 0.1 mol %, about 0.5 mol %, or about 1 mol %. The ammonia product in line 142 can have a methane concentration of 0 mol %, about 2 mol %, about 4 mol %, or about 5 mol % to about 6 mol %, about 9 mol %, about 12 mol %, or about 15 mol %. The ammonia product in line 142 can have an argon concentration of about 1 mol %, about 2 mol %, about 3 mol %, or about 4 mol % to about 5 mol %, about 6 mol %, about 8 mol %, or about 10 mol %. The ammonia product in line 142 can be at a temperature of about 200° C., about 250° C., about 300° C., or about 350° C. to about 400° C., about 430° C., about 450° C., or about 500° C. The ammonia product in line 142 can be at a pressure of about 9,000 kPa, about 11,000 kPa, about 12,000 kPa, or about 13,000 kPa to about 14,000 kPa, about 16,000 kPa, about 18,000 kPa, or about 20,000 kPa.

The ammonia product via line 142 can be introduced to the first heat exchanger 150 to produce a first cooled product via line 152. For example, heat can be transferred from the ammonia product in line 142 to a first heat transfer medium via line 151 to produce a second heat transfer medium via line 153 and the first cooled product via line 152. The first heat exchanger 150 can be or include one or more shell and tube heat exchangers, one or more concentric flow heat exchangers, one or more plate and frame heat exchangers, or any other heat exchanging device. The first heat exchanger can be or include a stacked boiler with a steam drum and/or a vertical boiler integrated drum.

The first heat transfer medium in line 151 can be process water, boiler feed water, superheated low pressure steam, superheated medium pressure steam, superheated high pressure steam at a temperature of about 50° C. to about 350° C., saturated low pressure steam, saturated medium pressure steam, saturated high pressure steam, and the like. The first heat transfer medium in line 151 can have a temperature of about 50° C., about 100° C., about 150° C., or about 200° C. to about 240° C., about 260° C., about 300° C., or about 350° C. and a pressure of about 50 kPa, about 500 kPa, about 1,000 kPa, or about 5,000 kPa to about 10,000 kPa, about 12,000 kPa, about 15,000 kPa, or about 20,000 kPa. The second heat transfer medium in line 153 can have a temperature of about 100° C., about 200° C., about 300° C., or about 375° C. to about 425° C., about 450° C., about 500° C., or about 600° C. and a pressure of 50 kPa, about 500 kPa, about 1,000 kPa, or about 5,000 kPa to about 10,000 kPa, about 12,000 kPa, about 15,000 kPa, or about 20,000 kPa. The first cooled product in line 152 can be at a temperature of 150° C., about 175° C., about 250° C., or about 300° C. to about 325° C., about 335° C., about 355° C., or about 375° C. The first cooled product in line 152 can be at a pressure of about 9,000 kPa, about 11,000 kPa, about 13,000 kPa, or about 15,000 kPa to about 16,000 kPa, about 17,000 kPa, about 18,000 kPa, or about 20,000 kPa.

The first cooled product via line 152 can be introduced to the second heat exchanger 155 to produce a fourth cooled product via line 156. For example, heat can be transferred from the first cooled product via line 152 to a third heat transfer medium via line 157 to produce a fourth heat transfer medium via line 159. The second heat exchanger 155 can be the same as, similar to, or different from the first heat exchanger 150 discussed and described above. The second heat exchanger can be a boiler feed water preheater or a waste heat boiler. The third heat transfer medium in line 157 can have a temperature of about 50° C., about 75° C., about 100° C., or about 125° C. to about 135° C., about 165° C., about 200° C., or about 250° C. and a pressure of about 50 kPa, about 1,000 kPa, about 5,000 kPa, or about 10,000 kPa to about 12,500 kPa, about 14,000 kPa, about 17,000 kPa, or about 20,000 kPa. The fourth heat transfer medium in line 159 can have a temperature of 150° C., about 200° C., about 250° C., or about 300° C. to about 315° C., about 325° C., about 355° C., or about 375° C. and a pressure of about 50 kPa, about 1,000 kPa, about 5,000 kPa, or about 10,000 kPa to about 12,500 kPa, about 14,000 kPa, about 17,000 kPa, or about 20,000 kPa. The second cooled produce in line 156 can be at a temperature about 100° C., about 135° C., about 165° C., or about 175° C. to about 185° C., about 225° C., about 250° C., or about 300° C. The second cooled produce in line 156 can be at a pressure of about 9,000 kPa, about 11,000 kPa, about 13,000 kPa, or about 15,000 kPa to about 16,000 kPa, about 17,000 kPa, about 18,000 kPa, or about 20,000 kPa. In one or more embodiments, the second heat exchanger 155 is not present in the system.

The second cooled product via line 156 can be introduced to the third heat exchanger 135 to produce a third cooled product via line 158. The third heat exchanger 135 can be the same as, similar to, or different from the first heat exchanger 150 discussed and described above. In one or more embodiments, the third heat exchanger 135 can transfer heat from the second cooled product in line 156 to the combined syngas in line 126 to produce the third cooled product via line 158 and a heated combined syngas via line 138. The heated combined syngas in line 138 can be at a temperature of about 100° C., about 135° C., about 165° C., or about 175° C. to about 185° C., about 225° C., about 250° C., or about 300° C. The heated combined syngas in line 138 can be at a pressure of about 9,000 kPa, about 11,000 kPa, about 14,000 kPa, or about 15,000 kPa to about 16,000 kPa, about 17,000 kPa, about 18,000 kPa, or about 20,000 kPa. The heated combined syngas in line 138 can then be introduced to the first ammonia convert 130 to produce the effluent via line 132. The third cooled product in line 158 can be at a temperature of about 60° C., about 85° C., about 95° C., or about 105° C. to about 125° C., about 150° C., about 175° C., or about 200° C. The third cooled product in line 158 can be at a pressure of about 9,000 kPa, about 11,000 kPa, about 13,000 kPa, or about 14,000 kPa to about 15,000 kPa, about 16,000 kPa, about 18,000 kPa, or about 20,000 kPa. If the system 100 does not include the second heat exchanger 155, the first cooled product via line 152 can be introduced to the third heat exchanger 135.

As shown in FIG. 1, the system 100 can also include one or more first coolers 160, one or more second coolers 165, and one or more purge gas recovery units 180. The coolers 160, 165 and the purge gas recovery unit 180 are optional components and will be further discussed and described below. As such, the third cooled product 158 can be introduced to the separator 175 to provide the purified ammonia product via line 176 and the recycle gas via line 178. The purified ammonia product in line 176 can have an ammonia concentration of about 95 mol %, about 98 mol %, about 99 mol %, or about 99.9 mol % to about 99.92 mol %, about 99.95 mol %, about 99.999 mol %, or about 100 mol %. The purified ammonia product in line 176 can have a hydrogen concentration of 0 mol %, about 0.001 mol %, about 0.005 mol %, or about 0.01 mol % to about 0.05 mol %, about 0.1 mol %, about 0.5 mol %, or about 1 mol %. The purified ammonia product in line 176 can have a nitrogen concentration of 0 mol %, about 0.001 mol %, about 0.005 mol %, or about 0.01 mol % to about 0.05 mol %, about 0.1 mol %, about 0.5 mol %, or about 1 mol %. The purified ammonia product in line 176 can have an argon concentration of 0 mol %, about 0.0001 mol %, about 0.0005 mol %, or about 0.001 mol % to about 0.005 mol %, about 0.01 mol %, about 0.05 mol %, or about 0.10 mol %. The purified ammonia product in line 176 can be at a temperature of about −35° C., about −15° C., about 0° C., or about 15° C. to about 30° C., about 35° C., about 40° C., or about 50° C. The purified ammonia product in line 176 can be at a pressure of about 100 kPa, about 500 kPa, about 1,000 kPa, or about 2,000 kPa to about 2,200 kPa, about 2,600 kPa, about 3,000 kPa, or about 3,500 kPa.

The recycle gas in line 178 can include unreacted gas separated from the ammonia product. For example, the recycle gas in line 178 can include, but is not limited to, hydrogen, nitrogen, carbon dioxide, carbon monoxide, methane, argon, or any combination thereof. The recycle gas in line 178 can have a hydrogen concentration of about 55 mol %, about 58 mol %, about 62 mol %, or about 65 mol % to about 67 mol %, about 69 mol %, about 72 mol %, or about 75 mol %. The recycle gas in line 178 can have a nitrogen concentration of about 10 mol %, about 13 mol %, about 16 mol %, or about 19 mol % to about 21 mol %, about 22 mol %, about 25 mol %, or about 30 mol %. The recycle gas in line 178 can have a carbon dioxide concentration of 0 mol %, about 0.001 mol %, about 0.005 mol %, or about 0.01 mol % to about 0.05 mol %, about 0.1 mol %, about 0.5 mol %, or about 1 mol %. The recycle gas in line 178 can have a carbon monoxide concentration of 0 mol %, about 0.001 mol %, about 0.005 mol %, or about 0.01 mol % to about 0.05 mol %, about 0.1 mol %, about 0.5 mol %, or about 1 mol %. The recycle gas in line 178 can have a methane concentration of 0 mol %, about 3 mol %, about 5 mol %, or about 7 mol % to about 8 mol %, about 10 mol %, about 12 mol %, or about 15 mol %. The recycle gas in line 178 can have an argon concentration of about 1 mol %, about 2 mol %, about 3 mol %, or about 4 mol % to about 5 mol %, about 6 mol %, about 8 mol %, or about 10 mol %.

The separator 175 can include any system, device, or combination of systems and/or devices capable of separating at least a portion of any impurities contained in the ammonia product via line 176. For example, the separator 175 can be or include one or more distillation columns or fractionation columns. The separator 175 can be or include a vessel. The vessel can be empty, partially filled, or completely filled with one or more materials to improve mass transfer and/or separation of impurities from the ammonia product. For example, the fill material can include, but is not limited to, structured materials, random packed materials, trays, or any combination thereof. Two or more types of fill material can be disposed within the separator 175. For example, the separator 175 can include random dumped packing and one or more trays.

As used herein, the term "trays" can include, but is not limited to, one or more types of trays that can improve the contact between gas and/or liquid phases within the separator 175. Illustrative trays can include, but are not limited to perforated trays, sieve trays, bubble cap trays, floating valve trays, fixed valve trays, tunnel trays, cartridge trays, dual flow trays, baffle trays, shower deck trays, disc and donut trays, orbit trays, horse shoe trays, cartridge trays, snap-in valve trays, chimney trays, slit trays, or any combination thereof. As used herein, the term "packing material" can include, but is not limited one or more types of structured and/or random shaped material disposed within the separator 175. The packing material can increase the effective surface area within the separator 175, which can improve the mass transfer between liquid and/or gas phases within the separator 175. The packing material can be made of any suitable material, for example metals, non-metals, polymers, ceramics, glasses, or any combination thereof. Illustrative examples of random packing material can include, but are not limited to, Raschig rings, Lessing rings, I-rings, saddle rings, INTALOX® saddles, TELLERETTES® packing, Pall rings, U-rings, or any combination thereof. Illustrative examples of commercially available structured packing can include, but are not limited to, structured packing, corrugated sheets, crimped sheets, gauzes, grids, wire mesh, monolith honeycomb structures, or any combination thereof.

As noted above, the system 100 can also include one or more first coolers 160, one or more second coolers 165, and one or more purge gas recovery units 180. As such, the third cooled product via line 158 can be introduced to the first cooler 160 to produce a forth cooled product via line 162. The first cooler 160 can be the same as, similar to, or different from the first heat exchanger 150 discussed and described above. The first cooler 160 can be a shell and tube heat exchanger using a cooling medium, which can include cooling water, chilled water, ammonia, or any other cooling medium. In one or more embodiments, the first cooler 160 can be a refrigeration unit. In one or more embodiments, the first cooler can be a cooler or chiller for cooling and/or thermal conditioning for ammonia condensing. The makeup refrigerant and the third cooled product 158 can cyclically condense and flash through a plurality of stages (not shown) within the first cooler 160, and can produce the fourth cooled product via line 162, in a manner known in the art. The fourth cooled product in line 162 can be at a temperature of about 0° C., about 5° C., about 10° C., or about 14° C. to about 20° C., about 28° C., about 35° C., or about 45° C. The fourth cooled product in line 162 can be at a pressure of about 9,000 kPa, about 11,000 kPa, about 13,000 kPa, or about 13,500 kPa to about 14,000 kPa, about 15,000 kPa, about 18,000 kPa, or about 20,000 kPa.

The fourth cooled product via line 162 can be introduced to the second cooler 165 to produce a fifth cooled product via line 166. The second cooler 165 can be the same as, similar to, or different from the first cooler 160 discussed and described above. The fifth cooled product in line 166 can be at a temperature of about −30° C., about −25° C., about −20° C., or about |15° C. to about −5° C., about 0° C., about 15° C., or about 30° C. The fifth cooled product in line 166 can be at a pressure of about 9,000 kPa, about 11,000 kPa, about 13,000 kPa, or about 13,500 kPa to about 14,000 kPa, about 15,000 kPa, about 18,000 kPa, or about 20,000 kPa.

The fifth cooled product via line 166 can be introduced to the separator 175 to produce the purified ammonia product via line 176 and the recycle gas via line 178. In one or more embodiments, heat can be transferred to from the fourth cooled product in line 162 to the recycle gas in line 178 within the second cooler 165 to produce the fifth cooled product via line 166 and a heated recycle gas via line 168. The heated recycle gas in line 168 can be at a temperature of about 10° C. to about 70° C. or about 20° C. to about 50° C.

In one or more embodiments, at least a portion of the recycle gas via line 178 and/or 168 can be recycled to one or more lines in the system 100. For example, at least a portion of the recycle gas in line 178 and/or 168 can be recycled to the first ammonia converter 130 and/or the second ammonia converter 140. In another example, at least a portion of the recycle gas via line 178 and/or 170 can be introduced to the second compressor unit 120 and to make up at least a portion of the second compressed syngas in line 122. Though not shown, at least a portion of the recycle gas in line 178 and/or 168 can be recycled to at least one of the syngas in lines 102, 104, and 106, the first compressor unit 110, the combined syngas in line 126, or any combination thereof. In one or more embodiments, at least a portion of purge gas via line 171 can be introduced to a purge gas recovery unit 180. In one or more embodiments, the recycle gas via line 172 can be recycled to one or more syngas reformers (not shown).

In one or more embodiments, the purge gas recovery unit 180 can optionally include an argon separation unit (not shown), which can reduce the amount of argon in the purge gas in line 171. For example, the purge gas recovery unit 180 can include an argon separation unit that can produce an argon-lean recycle gas and an argon-rich gas. The purge gas recovery unit 180 can include an ammonia recovery unit (not shown) to recover at least a portion any ammonia present in the purge gas 171 to produce an ammonia-lean purge gas. The ammonia-lean purge gas can be processed to recover at least a portion of any hydrogen present therein. Hydrogen recovery can be accomplished by using any one or more of a number of schemes available, including, but not limited to, cryogenic separation, membrane separation, etc. Cryogenic separation can have additional facility to recover argon and/or nitrogen from the purge gas. The hydrogen and nitrogen recovered from purge gas recovery unit 180 is sent back to system 100. The purge gas recovery units 180 are typically characterized by percentage hydrogen recovery and nitrogen recovery. The hydrogen recovery typically range from 80% to 98% and nitrogen recovery range from 5% to 70%.

FIG. 2 depicts a schematic of an illustrative system 200 for producing a syngas via line 212, according to one or more embodiments. The system 200 can include one or more reforming units 210 configured to reform a hydrocarbon via line 202 to produce the syngas via line 212. The reforming unit 210 can include one or more primary reformers, one or more secondary reformers, one or more reforming exchangers, or any combination thereof. The syngas via line 212 can be introduced to one or more gas shift converters 220 to convert at least a portion of any carbon monoxide in the syngas to carbon dioxide to produce a shifted syngas via line 222.

In one or more embodiments, at least a portion of the shifted syngas via line 222 can be introduced to one or more purification units 230 to produce a first purified syngas via line 232. The purification unit 230 can include one or more carbon dioxide removal units, one or more methanators, one or more driers, or any combination thereof. The first purified syngas in line 232 can have a hydrogen-to-nitrogen molar ratio of about 1.8:1, about 2:1, about 2.3:1, or about 2.5:1 to about 2.7:1, about 3:1, about or about 3.1:1. The first purified syngas in line 232 can have a hydrogen concentration of about 60 mol %, about 65 mol %, about 68 mol %, or about 70 mol % to about 73 mol %, about 76 mol %, about 80 mol %, or about 85 mol %. The first purified syngas in line 232 can have a nitrogen concentration of about 10 mol %, about 18 mol %, about 25 mol %, about 27 mol % to about 29 mol %, about 31 mol %, about 35 mol %, or about 40 mol %. The first purified syngas in line 232 can have a carbon monoxide concentration of 0 mol %, about 0.0001 mol %, about 0.0005 mol %, or about 0.001 mol % to about 0.005 mol %, about 0.01 mol %, about 0.05 mol %, or about 0.1 mol %. The first purified syngas in line 232 can have a carbon dioxide concentration of 0 mol %, about 0.0001 mol %, about 0.0005 mol %, or about 0.001 mol % to about 0.005 mol %, about 0.01 mol %, about 0.05 mol %, or about 0.1 mol %.

In at least one embodiment, a second portion of the shifted syngas via line 224 can be introduced to one or more pressure swing adsorption ("PSA") units 240 to produce a second purified syngas via line 242. The PSA unit 240 can remove at least a portion of any water, carbon dioxide, carbon monoxide, argon, nitrogen, methane, or any combination thereof present in the second syngas to produce the purified second syngas via line 242. The purified second syngas in line 242 can have an increased concentration of hydrogen relative to the second syngas in lines 214, 224. The PSA unit 240 can utilize one or more gas separation technologies including, but not limited to, pressure swing absorption, pressure swing adsorption, or a combination thereof. Suitable absorbents can include caustic soda, potassium carbonate or other inorganic bases, and/or alkanolamines.

In one or more embodiments, at least a portion of the syngas in line 212 can be introduced via line 214 to the pressure swing adsorption unit 240 to produce the second purified syngas via line 242. The second purified syngas in line 242 can have a hydrogen-to-nitrogen molar ratio of about 15:1 to about 4:1 or about 12:1 to about 5:1. The second purified syngas in line 242 can have a hydrogen concentration of about 75 mol %, about 85 mol %, about 89 mol %, or about 91 mol % to about 94 mol %, about 98 mol %, about 99 mol %, or about 99.5 mol %. The second purified syngas in line 242 can have a nitrogen concentration of about 0.1 mol %, about 2 mol %, about 8 mol %, or about 10 mol % to about 12 mol %, about 15 mol %, about 20 mol %, or about 25 mol %. The second purified syngas in line 242 can have a carbon monoxide concentration of 0 mol %, about 0.001 mol %, about 0.005 mol %, or about 0.01 mol % to about 0.05 mol %, about 0.1 mol %, about 0.5 mol %, or about 1 mol %. The second purified syngas in line 242 can have a carbon dioxide concentration of 0 mol %, about 0.001 mol %, about 0.005 mol %, or about 0.01 mol % to about 0.05 mol %, about 0.1 mol %, about 0.5 mol %, or about 1 mol %.

The second purified syngas in line 242 can be combined with the first purified syngas in line 232 to produce a syngas with a hydrogen-to-nitrogen molar ratio of about 3.5:1 to about 2.5:1 or about 3.2:1 to about 2.8:1. The first purified syngas via line 232, either alone, mixed or otherwise combined with the second purified syngas in line 242, can be introduced to an ammonia synthesis unit 250 via line 102. The ammonia synthesis unit 250 can be or include the system 100 discussed and described above with reference to FIG. 1.

In one or more embodiments, the ammonia synthesis unit can produce the recycle gas 178 as discussed and described above in reference to FIG. 1. The recycle gas via line 365 can be recycled to the second portion of the syngas in line 224 prior to being introduced to the pressure swing adsorption unit 240. In one or more embodiments, the recycle gas via line 258 can be introduced to the reformer unit 310 to produce the syngas in line 212.

FIG. 3 is a schematic of another illustrative system 300 for producing a syngas via line 312, according to one or more embodiments. The system 300 can include the one or more reforming units 210, one or more gas shift converters 220, one or more purification units 230, and one or more ammonia synthesis units 250, which can be as discussed and described above with reference to FIG. 2. The system 300 can also include one or more air separation units 310 and one or more nitrogen wash units 340. The air separation unit 310 can provide an oxygen-rich gas via line 311 and a nitrogen-rich gas via line 313. The oxygen-rich gas via line 311 can be introduced to the reforming unit 210, e.g., the secondary reformer, to be used as an oxidant. The nitrogen-rich gas in line 313 can be introduced to one or more nitrogen wash units 340 to further purify the first purified syngas in line 332. The nitrogen via line 313 can be introduced to the first purified syngas in line 332 to provide the syngas in line 102 having a hydrogen-to-nitrogen molar ratio of about 3:1, e.g., about 2.9:1 to about 3.1:1.

The nitrogen wash unit 340 can be operated at a temperature of about −195° C., about 190° C., about −185° C., or about −170° C. to about −125° C., about 0° C., about 30° C., or about 65° C. The nitrogen wash unit 340 can be operated at a pressure of about 2,000 kPa, about 2,400 kPa, about 2,600 kPa, or about 2,750 kPa to about 3,000 kPa, about 3,500 kPa, about 4,500 kPa, or about 5,500 kPa. The nitrogen wash unit 340 can be configured to receive the nitrogen-rich stream from the air separation unit 310 via line 313, a second air separation unit (not shown), a nitrogen source external to the system 300, or any combination thereof. The nitrogen-rich stream 313 can include air or liquid with an increased nitrogen content, pure nitrogen, nitrogen enriched stream, or any mixture thereof. The nitrogen can be provided, produced, or otherwise obtained from any suitable source located within the system 300 or from outside the system 300.

Prophetic Examples

In order to provide a better understanding of the foregoing discussion, the following non-limiting simulated examples are offered. Although the examples may be directed to specific embodiments, they are not to be viewed as limiting the invention in any specific respect. All parts, proportions, and percentages are by weight unless otherwise indicated. The examples below are compared to a method for producing ammonia that is known in the art, and referred to hereinafter to as the "Base Case."

Table 1 shows simulated process results for the Base Case, in which a single stream of syngas is compressed in a first compressor and introduced to a first and second ammonia converter to produce an ammonia product. The ammonia product is cooled in a first, second, and third heat exchanger. The ammonia product is then cooled in a first and second cooler to produce the cooled ammonia product introduced to a separator to produce a purified ammonia product. Examples 1 and 2 are modifications of the Base Case. In Examples 1 and 2, the syngas is divided into two streams and the first stream is introduced to a first compressor and the second stream is introduced to a second compressor. The first compressed stream is then indirectly heated in a second ammonia converter. The heated first stream is then mixed with the second compressed stream to produce a combined syngas. The combined syngas is then introduced to the first and second ammonia converters as discussed above with regard to the Base Case.

TABLE 1

| | Base Case | Example 1 | Example 2 |
|---|---|---|---|
| Syngas (102) | | | |
| Hydrogen-to-nitrogen molar ratio | 2.89 | 2.78 | 3.0 |
| $H_2$ Conc. (mol %) | 73.5 | 74.1 | 75.0 |
| $N_2$ Conc. (mol %) | 25.4 | 26.6 | 25 |
| Pressure (kPa) | 2,684 | 2,680 | 2,626 |
| Temperature (° C.) | 5.5 | 5.5 | 7.0 |
| Volume ($m^3$/hr) | 6,282 | 153% | 143% |
| First Compressed Syngas (112) | | | |
| Pressure (kPa) | — | 14,300 | 14,300 |
| Temperature (° C.) | — | 86 | 85 |
| First Heated Syngas (118) | | | |
| Pressure (kPa) | — | 14,200 | 14,200 |
| Temperature (° C.) | — | 96 | 95 |
| Second Compressed Syngas (122) | | | |
| Pressure (kPa) | 14,130 | 14,330 | 14,330 |
| Temperature (° C.) | 74 | 63 | 68 |
| Combined Syngas (126) | | | |
| Pressure (kPa) | 14,130 | 14,330 | 14,330 |
| Temperature (° C.) | 74 | 70 | 75 |

TABLE 1-continued

| | Base Case | Example 1 | Example 2 |
|---|---|---|---|
| Combined Syngas (138) | | | |
| Hydrogen-to-nitrogen molar ratio | 3.0 | 3.0 | 3.0 |
| $H_2$ Conc. (mol %) | 67.5 | 68.5 | 75 |
| $N_2$ Conc. (mol %) | 22.2 | 22.8 | 25 |
| Pressure (kPa) | 14,100 | 14,200 | 14,200 |
| Temperature (° C.) | 130 | 133 | 128 |
| Effluent (132) | | | |
| Ammonia Conc. (mol %) | 16.4 | 17.9 | 17.9 |
| $H_2$ Conc. (mol %) | 56.1 | 55.0 | 61.5 |
| $N_2$ Conc. (mol %) | 18.4 | 18.3 | 20.6 |
| Pressure (kPa) | 12,850 | 13,450 | 13,450 |
| Temperature (° C.) | 335 | 370 | 375 |
| Volume ($m^3$/hr) | 9,471 | 108% | 101% |
| Ammonia Product (142) | | | |
| Ammonia Conc. (mol %) | 16.4 | 21.4 | 21.4 |
| $H_2$ Conc. (mol %) | 56.1 | 52.2 | 58.9 |
| $N_2$ Conc. (mol %) | 18.4 | 17.3 | 19.7 |
| Pressure (kPa) | 12,850 | 13,300 | 13,300 |
| Temperature (° C.) | 335 | 415 | 420 |
| Volume ($m^3$/hr) | 9,471 | 113% | 103% |
| First Cooled Product (152) | | | |
| Pressure (kPa) | 12,800 | 13,250 | 13,250 |
| Temperature (° C.) | 330 | | |
| Second Cooled Product (156) | | | |
| Pressure (kPa) | 12,750 | 13,200 | 13,200 |
| Temperature (° C.) | 164 | 164 | 164 |
| Third Cooled Product (158) | | | |
| Pressure (kPa) | 12,700 | 13,150 | 13,150 |
| Temperature (° C.) | 52 | 90 | 90 |
| Fourth Cooled Product (162) | | | |
| Pressure (kPa) | 12,650 | 13,100 | 13,100 |
| Temperature (° C.) | 33 | 33 | 33 |
| Fifth Cooled Product (166) | | | |
| Pressure (kPa) | 13,600 | 13,050 | 13,050 |
| Temperature (° C.) | −23 | −27 | −27 |
| Purified Ammonia Product (176) | | | |
| Pressure (kPa) | 2,100 | 2,100 | 2,100 |
| Temperature (° C.) | −23 | −27 | −27 |

As shown in Table 1, the Base Case processes an overall feed flow of 6,282 m3/hr and produces an ammonia product (at 142) having an ammonia concentration of 16.4 mol %. However, Example 1 processes an overall feed flow 153% greater than the Base Case, and produces an ammonia product (at 142) having an ammonia concentration of 21.4 mol % at a flow rate 113% higher than the Base Case. Example 2 processes an overall feed flow 143% greater than the Base Case, and produces an ammonia product (at 142) having an ammonia concentration 21.4 mol % at a flow rate 103% higher than the Base Case. Examples 1 and 2 maintain a higher pressure than the Base Case through the first and second ammonia converters, the first, second, and third heat exchangers, and the first cooler. In the Base Case, the fifth cooled product leaving the second cooler has a pressure of 13,600 kPa and a temperature of −23° C. However, the fifth cooled product of Examples 1 and 2 have pressure of 13,050 kPa and a temperature of −27° C., which can be more favorable for downstream separation to produce a purified ammonia product.

Embodiments of the present disclosure further relate to any one or more of the following paragraphs:

1. A method for producing ammonia, comprising compressing a first syngas and a second syngas to produce a first compressed syngas and a second compressed syngas; heating the first compressed syngas to produce a heated first syngas at a temperature of about 60° C. to about 350° C.; combining the heated first syngas and the second compressed syngas to produce a combined syngas at a temperature of about 60° C. to about 200° C.; reacting the combined syngas in a first ammonia converter to produce an effluent; reacting the effluent in a second ammonia converter to produce an ammonia product; transferring heat from the ammonia product to a first heat transfer medium to produce a first cooled product at a temperature of about 150° C. to about 375° C. and a second heat transfer medium; transferring heat from the first cooled product to a third heat transfer medium to produce a second cooled product; transferring heat from the second cooled product to the combined syngas to produce a third cooled product; and separating the third cooled product to produce a purified ammonia product and a recycle gas.

2. The method according to paragraph 1, wherein the first compressed syngas is at a pressure of about 9,000 kPa to about 20,000 kPa, and wherein the second compressed syngas is at a pressure of about 9,000 kPa to about 20,000 kPa.

3. The method according to paragraph 1 or 2, wherein the second compressed syngas is heated in the second ammonia converter by indirect heat exchange.

4. The method according to any one of paragraphs 1 to 3, wherein the effluent has an ammonia concentration of about 10 mol % to about 28 mol %.

5. The method according to any one of paragraphs 1 to 4, wherein the effluent has a hydrogen concentration of about 45 mol % to about 65 mol % and a nitrogen concentration of about 10 mol % to about 30 mol %.

6. The method according to any one of paragraphs 1 to 5, wherein the ammonia product has an ammonia concentration of about 10 mol % to about 30 mol %, a hydrogen concentration of up to about 0.5 mol %, and a nitrogen concentration of up to about 0.3 mol %.

7. The method according to any one of paragraphs 1 to 6, wherein the second heat transfer medium is at a temperature of about 100° C. to about 600° C. and a pressure of about 50 kPa to about 20,000 kPa.

8. The method according to any one of paragraphs 1 to 7, further comprising transferring heat from the ammonia product to the recycle gas to produce a heated recycle gas and a cooled ammonia product.

9. The method according to any one of paragraphs 1 to 8, wherein at least a portion of the recycle gas is compressed with the second syngas to produce the second compressed syngas.

10. The method according to any one of paragraphs 1 to 9, wherein the first compressed syngas has a water concentration of up to about 1 mol % and the second compressed syngas has a water concentration of up to about 1 mol %.

11. The method according to any one of paragraphs 1 to 10, further comprising reforming a hydrocarbon to produce the syngas, wherein at least a portion of the recycle gas is combined with the hydrocarbon prior to reforming the hydrocarbon.

12. The method according to any one of paragraphs 1 to 11, further comprising separating a raw syngas and at least a portion of the recycle gas in a pressure swing adsorption unit to produce the syngas.

13. A method for producing ammonia, comprising compressing a first syngas and a second syngas to produce a first compressed syngas and a second compressed syngas; heating the first compressed syngas to produce a heated first syngas at a temperature of about 60° C. to about 250° C.; combining the heated first syngas and the second compressed syngas to produce a combined syngas at a temperature of about 60° C. to about 200° C.; reacting the combined syngas in a first ammonia converter to produce an effluent having an ammonia concentration of about 10 mol % to about 20 mol %; reacting the effluent in a second ammonia converter to produce an ammonia product having an ammonia concentration of about 15 mol % to about 30 mol %; transferring heat from the ammonia product to a first heat transfer medium to produce a first cooled product at a temperature of about 150° C. to about 375° C. and a second heat transfer medium; transferring heat from the first cooled product to a third heat transfer medium to produce a second cooled product; transferring heat from the second cooled product to the combined syngas to produce a third cooled product; and separating the third cooled product to produce a purified ammonia product and a recycle gas.

14. The method according to paragraph 13, further comprising cooling the third cooled product to produce a fourth cooled product at a temperature of about 0° C. to about 45° C.; cooling the fourth cooled product to produce a fifth cooled product at a temperature of about −30° C. to about 30° C.; and separating the fifth cooled product to produce the purified ammonia product and the recycle gas.

15. The method according to paragraph 13 or 14, wherein heat is transferred from the fourth cooled product to the recycle gas to produce the fifth cooled product at a temperature of about −30° C. to about 30° C. and a heated recycle gas at a temperature of about 10° C. to about 70° C.

16. A system for making ammonia, comprising a first compressor unit configured to compress a first syngas to produce a first compressed syngas; a second compressor unit configured to compress a second syngas to produce a second compressed syngas, a conduit configured to combine a heated first syngas and the second compressed syngas to provide a combined syngas at a temperature of about 60° C. to about 200° C.; a first ammonia converter configured to react the combined syngas to produce an effluent; a reaction zone contained in a second ammonia converter configured to react the effluent to produce an ammonia product, wherein heat from the reaction zone is transferred to the first compressed syngas by indirect heat exchange to produce the heated first syngas at a temperature of about 60° C. to about 350° C.; a first heat exchanger configured to transfer heat from the ammonia product to a first heat transfer medium to produce a first cooled product at a temperature of about 150° C. to about 375° C. and a second heat transfer medium; a second heat exchanger configured to transfer heat from the first cooled product to a third heat transfer medium to produce a fourth heat transfer medium at a temperature of about 75° C. to about 300° C. and a second cooled product; a third heat exchanger configured to transfer heat from the second cooled product to the combined syngas to produce a third cooled product; and a separator configured to separate the third cooled product to produce a purified ammonia product and a recycle gas.

17. The system according to paragraph 16, further comprising a first cooler configured to cool the third cooled product to produce a fourth cooled product; and a second cooler configured to cool the fourth cooled product to produce a fifth cooled product, wherein the second cooler is in fluid communication with the separator.

18. The system according to paragraph 16 or 17, wherein the first cooler is a shell tube heat exchanger.

19. The system according to any one of paragraphs 16 to 18, wherein the second ammonia converter is a cold wall converter.

20. The system according to any one of paragraphs 16 to 19, wherein the first compressor unit is configured to remove at least a portion of the water present in the first syngas to produce the first compressed syngas.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for producing ammonia, comprising:
    compressing a first syngas and a second syngas to produce a first compressed syngas and a second compressed syngas;
    heating the first compressed syngas to produce a heated first syngas at a temperature of about 60° C. to about 350° C.;
    combining the heated first syngas and the second compressed syngas to produce a combined syngas at a temperature of about 60° C. to about 200° C.;
    reacting the combined syngas in a first ammonia converter to produce an effluent;
    reacting the effluent in a second ammonia converter to produce an ammonia product;
    transferring heat from the ammonia product to a first heat transfer medium to produce a first cooled product at a temperature of about 150° C. to about 375° C. and a second heat transfer medium;
    transferring heat from the first cooled product to a third heat transfer medium to produce a second cooled product;
    transferring heat from the second cooled product to the combined syngas to produce a third cooled product; and
    separating the third cooled product to produce a purified ammonia product and a recycle gas.

2. The method of claim 1, wherein the first compressed syngas is at a pressure of about 9,000 kPa to about 20,000 kPa, and wherein the second compressed syngas is at a pressure of about 9,000 kPa to about 20,000 kPa.

3. The method of claim I, wherein the second compressed syngas is heated in the second ammonia converter by indirect heat exchange.

4. The method of claim 1, wherein the effluent has an ammonia concentration of about 10 mol % to about 28 mol %.

5. The method of claim 4, wherein the effluent has a hydrogen concentration of about 45 mol % to about 65 mol % and a nitrogen concentration of about 10 mol % to about 30 mol %.

6. The method of claim 1, wherein the ammonia product has an ammonia concentration of about 10 mol % to about 30 mol %, a hydrogen concentration of up to about 0.5 mol %, and a nitrogen concentration of up to about 0.3 mol %.

7. The method of claim 1, wherein the second heat transfer medium is at a temperature of about 100° C. to about 600° C. and a pressure of about 50 kPa to about 20,000 kPa.

8. The method of claim 1, further comprising transferring heat from the ammonia product to the recycle gas to produce a heated recycle gas and a cooled ammonia product.

9. The method of claim 1, wherein at least a portion of the recycle gas is compressed with the second syngas to produce the second compressed syngas.

10. The method of claim 1, wherein the first compressed syngas has a water concentration of up to about 1 mol % and the second compressed syngas has a water concentration of up to about 1 mol %.

11. The method of claim 1, further comprising reforming a hydrocarbon to produce the syngas, wherein at least a portion of the recycle gas is combined with the hydrocarbon prior to reforming the hydrocarbon.

12. The method of claim 1, further comprising separating a raw syngas and at least a portion of the recycle gas in a pressure swing adsorption unit to produce the syngas.

13. A method for producing ammonia, comprising:
    compressing a first syngas and a second syngas to produce a first compressed syngas and a second compressed syngas;
    heating the first compressed syngas to produce a heated first syngas at a temperature of about 60° C. to about 250° C.;
    combining the heated first syngas and the second compressed syngas to produce a combined syngas at a temperature of about 60° C. to about 200° C.;
    reacting the combined syngas in a first ammonia converter to produce an effluent having an ammonia concentration of about 10 mol % to about 20 mol %;
    reacting the effluent in a second ammonia converter to produce an ammonia product having an ammonia concentration of about 15 mol % to about 30 mol %;
    transferring heat from the ammonia product to a first heat transfer medium to produce a first cooled product at a temperature of about 150° C. to about 375° C. and a second heat transfer medium;
    transferring heat from the first cooled product to a third heat transfer medium to produce a second cooled product;
    transferring heat from the second cooled product to the combined syngas to produce a third cooled product; and
    separating the third cooled product to produce a purified ammonia product and a recycle gas.

14. The method of claim 13, further comprising:
    cooling the third cooled product to produce a fourth cooled product at a temperature of about 0° C. to about 45° C.;
    cooling the fourth cooled product to produce a fifth cooled product at a temperature of about −30° C. to about 30° C.; and separating the fifth cooled product to produce the purified ammonia product and the recycle gas.

15. The method of claim 13, wherein heat is transferred from the fourth cooled product to the recycle gas to produce the fifth cooled product at a temperature of about −30° C. to about 30° C. and a heated recycle gas at a temperature of about 10° C. to about 70° C.

* * * * *